Jan. 6, 1925.

F. G. BREYER ET AL 1,522,098

ZINC OXIDE

Filed May 23, 1923    2 Sheets-Sheet 1

Fig. 1,

INVENTORS
Frank G. Breyer
Earl C. Gaskill
BY James A. Singmaster
Pennie, Davis, Marvin, & Edmonds
ATTORNEYS Patented Jan. 6, 1925.

1,522,098

UNITED STATES PATENT OFFICE.

FRANK G. BREYER, EARL C. GASKILL, AND JAMES A. SINGMASTER, OF PALMERTON, PENNSYLVANIA, ASSIGNORS TO THE NEW JERSEY ZINC COMPANY, OF NEW YORK, N. Y., A CORPORATION OF NEW JERSEY.

ZINC OXIDE.

Application filed May 23, 1923. Serial No. 640,846.

*To all whom it may concern:*

Be it known that we, FRANK G. BREYER, EARL C. GASKILL, and JAMES A. SINGMASTER, citizens of the United States, residing at Palmerton, county of Carbon, State of Pennsylvania, have invented certain new and useful Improvements in Zinc Oxides; and we do hereby declare the following to be a full, clear, and exact description of the invention, such as will enable others skilled in the art to which it appertains to make and use the same.

This invention relates to zinc oxide, and has for its object the provision, as a new article of manufacture, of an improved form of zinc oxide possessing new and characteristic properties.

The new zinc oxide product of the present invention is a fume product resulting from the highly intensive oxidation of zinc vapor and the substantially instantaneous chilling and dilution of the resulting suspended fume. The average particle of the new product is of extreme fineness, being ultra-microscopic in size, and substantially smaller than the average particle of any heretofore commercial zinc oxide product. The new zinc oxide product possesses properties which make it particularly advantageous for use in compounded rubber, and which differentiate it from zinc oxide products heretofore available and used in the compounded rubber art.

Heretofore, zinc oxide has been generally produced by either the American (or Wetherill) process or by the French (or retort volatilizing) process. The great bulk of the zinc oxide used in the rubber industry as a reinforcing agent has heretofore been manufactured by the American process. In the production of zinc oxide by the American process, a charge of zinciferous material mixed with a reducing agent and spread on an ignited bed of fuel is subjected to a combustion supporting blast or draft and brought to a sufficiently high temperature to reduce the compounds of zinc and volatilize the reduced metal, the zinc vapors burning in drifting or rolling flames above the top of the charge and in the off-take pipes or flues to zinc oxide which is collected in an appropriate manner. In the French process of producing zinc oxide, metallic zinc is melted and volatilized in appropriate receptacles or retorts, under non-oxidizing conditions, and the resulting metallic zinc vapor drifts or flows out of the mouth of the retort at low velocity and burns in the air with a quiet, rolling or drifting flame, thereby forming the zinc oxide which is collected in an appropriate manner. In these and other processes heretofore proposed for the production of zinc oxide by the burning or oxidation of metallic zinc vapor, there has been no appreciation of the fact that the nature of the flame itself has any influence on the physical properties of the oxide, nor has any attempt been made to control the physical properties of the oxide through control of the flame, especially by intensifying and limiting the dimensions thereof. The zinc oxide resulting from these prior processes has the physical appearance of an impalpable powder, but as a matter of fact, the particles are of a size within the range of photo-micrographic measurement with glass lenses and white light.

We have discovered that a zinc oxide product of greatly improved properties and of extreme and ultra-microscopic fineness can be produced by oxidizing an issuing stream of metallic zinc vapor by a blast of relatively cool oxidizing gas, such as air, where the gaseous blast restricts the zinc-oxide-forming area enveloping the issuing stream of zinc vapor and absorbs the heat generated in the zinc oxide forming area and substantially instantaneously cools the initially formed particles of zinc oxide. The oxidation by blasting of the issuing stream of zinc vapor preferably takes place in the open, or in an environment which permits such complete dissipation or absorption of the radiant energy of the oxidation as to substantially instantaneously cool the initially formed particles of zinc oxide to a temperature below 350° C. Thus, the oxidation by blasting may advantageously take place in a large open room, and if heat reflecting objects are in proximity to the zone of oxidation such objects should be maintained at so low a temperature that they absorb rather than reflect the radiant energy of the oxidation. Preferably, the volume and intensity of the gaseous blast and its heat-absorbing capacity are such that the particles of zinc oxide are cooled below a temperature of 350° C. in a very small fraction of a second, say in one-fiftieth (1/50) of a second or less, after their formation. The volume and intensity of the gaseous blast are such that the apparently white hot zone of oxidation is in reality so restricted and cool that the bare human hand may be passed back and forth through the oxidizing zone (flame) with impunity where the issuing stream of zinc vapor is the equivalent of 500 pounds of zinc issuing per hour from a nozzle eight inches in diameter. The stream of zinc vapor may be either undiluted or diluted by other gases such as carbon monoxide, nitrogen, hydrogen, etc. resulting from the method used in producing the zinc vapor.

In our copending applications for Letters Patent of the United States, Serial No. 473,051, filed May 27, 1921, and Serial No. 564,021, filed May 27, 1922, we have described and claimed methods of manufacturing various forms of the improved zinc oxide product forming the subject matter of the present invention. The present application is in part a continuation of the aforementioned applications.

Figure 1:
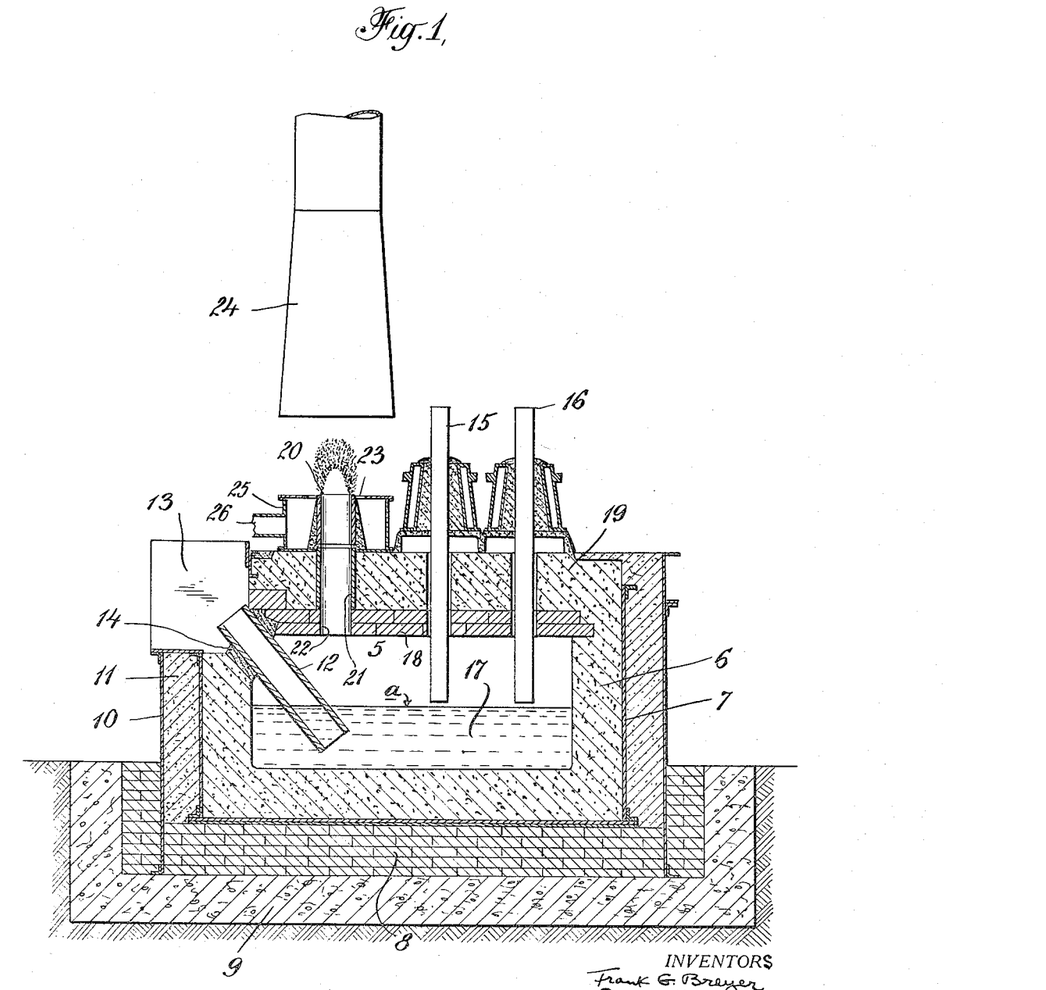
Fig. 1 of the accompanying drawing diagrammatically illustrates a construction of apparatus which we have found well suited for the manufacture, in one of its preferred forms, of our improved zinc oxide product.

The apparatus illustrated in the accompanying drawing comprises a zinc volatilizing chamber 5, which may consist of a crucible or retort of appropriate refractory material or may be formed of appropriate refractory material in the shape of bricks or otherwise. In the apparatus illustrated in the drawing, the volatilizing chamber 5 is about 6.5 feet long, about 2.5 feet wide and about 2.75 feet high, and is formed by a rammed or tamped lining 6, about 12 inches in thickness, of suitable refractory material. Various refractory mixes may be used to form the lining 6. We have secured excellent results with a mix containing 39 pounds water glass solution, 40° Baumé; 19 pounds water; 150 pounds furnace chrome; 150 pounds calcined magnesite.

The dry materials of this mix are ground to a size completely through 60 mesh, the greater part of the material being actually through 200 mesh. The ground materials are then mixed with the water glass and water for approximately one hour in a large rod mill. The resulting mixture is then rammed or tamped into position to form the chamber 5 and then appropriately dried.

The refractory lining 6 is enclosed by a sheet steel frame 7 resting upon several layers of sil-o-cel brick 8 laid upon a concrete or cement foundation 9. An outer sheet steel frame 10 surrounds the side walls of the apparatus, and the spaces between the vertical walls of the frames 7 and 10 are filled with sil-o-cel powder 11.

A feed pipe 12, of carborundum or other suitable refractory material, extends into the chamber 5 and provides means for feeding metallic zinc, in either a molten or solid state, into the chamber. The upper and outer end of the feed pipe 12 terminates in a housing 13 of such form as to permit the convenient charging of metallic zinc into the outer end or mouth of the pipe, and this housing (or the mouth of the pipe) may, if desired, be provided with an appropriate cover or door for enclosing the upper end of the pipe during the intervals between charging. The pipe 12 is sealed in position with respect to the chamber 5 by a mass 14 of refractory material similar to the refractory material of the lining 6.

A pair of vertically disposed and suitably spaced electrodes 15 and 16, preferably of graphite, extend into the chamber 5. The lower ends of these electrodes terminate a short distance above the level of the molten zinc 17 in the chamber 5. The electrodes 15 and 16 are connected to an appropriate source of electric energy, which may be either direct or alternating, and appropriate means (not shown) are provided for maintaining the electrodes suitably spaced above the level of the molten zinc 17 and for regulating the electric current.

The top of the chamber 5 is enclosed by a roof 18, preferably formed of graphite slabs. A thick layer 19 of refractory material, similar to that of the lining 6, is laid on top of the cover 18.

A carborundum nozzle 20 registering with a carborundum tube 21 and an opening 22 in the roof 18 provides an orifice for the discharge of zinc vapor from the chamber 5. Mounted on top of the layer 19, and surrounding the nozzle 20, is a circular compartment 25 adapted to be supplied with compressed air from any suitable source through a supply pipe 26. The compartment 25 has a circular opening 23 in its top, which opening is slightly larger than and approximately at the level of the discharge opening of the nozzle 20.

In the operation of the apparatus illustrated in the accompanying drawing for manufacturing our improved zinc oxide product, metallic zinc, preferably in a molten condition, is introduced into the chamber 5, through the feed pipe 12, until the chamber is filled to about the level indicated (by $a$) with molten zinc, and this approximate level is maintained in the normal operation of the apparatus. The passage of the electric current across the spaces or gaps between the electrodes 15 and 16 and the surface of the zinc 17 develops sufficient heat to maintain the zinc in a molten condition and to produce sufficient metallic zinc vapor so that a rapid stream of the vapor will escape through the nozzle 20. Where desired, sufficient heat may also be developed in this manner to melt additions of solid metallic zinc introduced into the chamber 5.

The space between the top surface of the molten zinc in the chamber 5 and the roof 18 becomes filled with metallic zinc vapor and this vapor passes through and is discharged from the nozzle 20 in a steady stream. As the zinc vapor issues from the nozzle 20, it comes in contact with the surrounding air and if uninfluenced would burn with the characteristic natural zinc flame. The opening 23 in the top of the compressed air compartment 25 directs an annular or circumferential blast or draft of air inwardly against the escaping stream of zinc vapor and causes its intense combustion. The effect of this air blast is to radically reduce the size of the zinc flame from the size which it would normally have if burning freely in the air in the absence of the air blast. The annular air blast has the further effect of causing the particles of zinc oxide produced by the combustion to instantly pass out of the high temperature zone of restricted combustion into the cool surrounding air, so that these particles are instantly chilled and diluted. The zinc oxide particles thus formed are drawn into the lower flared end or hood of a flue 24 by means of a suction fan or the like (not shown) in the flue system, and are conveyed through the flue system to a bag-house or to other appropriate means for the collection of the zinc oxide.

We have secured excellent results in the apparatus illustrated in the accompanying drawing under the following conditions: The chamber 5 contained approximately 10,000 pounds of molten zinc. The heating of the zinc was effected with an electric current of about 4,000 amperes with an alternating potential across the electrodes 15 and 16 of about 75 volts. The nozzle 20 was eight inches in diameter and about 500 pounds of metallic zinc were distilled off and passed through the nozzle per hour. About 4500 cubic feet of air per minute at a pressure of about ten inches of water were supplied to the compartment 25. The lower flared end or hood of the flue 24 was thirty-six inches in diameter and was mounted two feet above the discharge end of the nozzle 20. The temperature of the gases entering the lower end of the flue 24 varied from about 60° C. near the middle to about 20° C. at the periphery. The velocity in the flame was upwards of fifty feet per second and the total flame height, although it varied somewhat and was of an irregular character, was considerably less than a foot on the average, so that the particles of zinc oxide were formed and removed from the restricted combustion zone within a very small fraction of a second. The cooling effect of an air blast of the character described is, in fact, so great that the hand can be passed back and forth through the upper portion of what appears to be the flame without injury. This upper part of the apparent flame zone appears to the eye to still contain incandescent particles of zinc oxide diluted by cool air and undergoing rapid chilling so that the apparent flame zone or zone of incandescence extends somewhat beyond the high temperature zone of intensive combustion.

The fume product of the present invention, produced in the manner above described, is characterized by an extremely fine particle size, which distinguishes it from the present day standard high grades of zinc oxide produced by either the American or the French process.

The best commercial grades of American process zinc oxide which we have examined have an average particle size of from about 0.38 to about 0.52 microns (a micron is 0.001 millimeter) while the best commercial grades of French process zinc oxide, for example The New Jersey Zinc Company's U. S. P. brand, which we have examined have an average particle size of from about 0.36 to about 0.44 microns.

The improved zinc oxide product of the present invention has an average particle size not exceeding 0.25 microns and in its preferred form an average particle size of about 0.15 microns and less. The significance of this radical reduction in the size of the particles, in the case of the new product, will be evident from a consideration of the approximate number of particles per gram of the product. In the case of a zinc oxide, such as American or French process zinc oxide, of an average particle size of 0.5 microns, there are approximately 2.64 trillions of particles per gram; while with a product with an average particle size of 0.4 microns, there are approximately 5.17 trillion particles. With a product having an average particle size of 0.15 microns, the number of particles per gram is about 95.22 trillions; while with a product having an average particle size of 0.10 microns, the number of particles per gram increases to about 331 trillions. In other words, the improved product of the present invention, with an average particle size of 0.15 or less, contains many times as many particles per unit weight as the best commercial grades of American and French process oxides heretofore available.

When we refer to particle size, and to the number of particles per gram, of zinc oxide, we mean the diameter of the average particle, and we will define the diameter of a particle, for purposes of the present specification and appended claims, as the harmonic mean of the three cubical dimensions which is derived from measurements of these dimensions.

The definition and determination of the particle size, in the case of products such as zinc oxide, are rendered difficult because of the extreme fineness, and because of the enormous number of particles which even a small amount of the oxide contains. One may speak definitely of the diameter of a sphere, and of the definite particle size of a mass of spheres of uniform diameter; but in the case of zinc oxide we are dealing with a material which is not in the form of spheres and whose particles are not perfectly uniform, and hence the meaning of particle size is less definite than in the case of uniform spheres, and we have accordingly defined what we mean by particle size in the present specification.

The numerical values of particle size (i. e., diameter of the average particle) which we have given have been determined by photo-micrographing with blue light (with a 2-millimeter homogeneous immersion apochromatic lens of 1.3 numerical aperture and at a magnification of 1500 diameters) specimens properly dispersed in glycerin. These determinations have been made in accordance with the procedure described in the paper by Henry Green, Journal of the Franklin Institute, November, 1921, pages 637–666. Owing, however, to the ultra microscopic size of the particles of the present invention, recourse must be had to the use of ultra violet light and quartz lenses in carrying out the photo-micrographic method of measurement. The use of ultra violet light in micro-photographic methods is described, for example, in an article by Koehler and von Rohr, Zeitschrift fuer Instrumentenkunde, volume 24, pages 341–349.

Owing to the extreme particle size which characterizes the improved product of the present invention, and the radically increased number of particles which a unit weight of the product contains, the product can be used to advantage for various purposes. The new product is of particular value for use in compounding with rubber, and its use enables a radical improvement to be obtained in the resistance to abrasion of the rubber composition, while it also enables a marked increase to be obtained in the tensile strength of the rubber, and we have also obtained an acceleration of the cure and better ageing qualities.

As a standard of comparison, we will throughout this specification refer to the best grades of rubber reinforcing zinc oxide now manufactured as exemplified by The New Jersey Zinc Company's special grade Horsehead brand of zinc oxide. The Horsehead brand of zinc oxide has been most extensively used in the rubber industry for many years, and the special grade has been the accepted standard of uniformity in zinc oxide for rubber compounding over a number of years. This oxide has been made for many years by the well-known American or Wetherill process from the unique Franklinite ore of the Franklin mine in New Jersey. The properties and uniformity of this oxide are well recognized, and are referred to in standard authorities on rubber and pigments. This oxide has a particle size of about 0.5 microns, a lead content of about 0.15%, expressed as PbO, and a total sulfur content, of from 0.3 to 0.4%, expressed as $SO_3$. In the comparative illustrative examples hereinafter given, this product will be referred to as Horsehead brand zinc oxide, and is the standard of comparison employed in defining the novel properties and characteristics of the new zinc oxide product of the invention.

Zinc oxide for various reasons has long been used extensively in the rubber industry. The modern scientific rubber compounder, however, has three principal objects in view when he adds zinc oxide to rubber. (1) The first 2 to 5% (by weight) of zinc oxide is added to activate the organic accelerator. (2) The next step is to increase the zinc oxide added to the rubber compound to about 15% (by weight) in order to obtain better ageing. (3) Lastly, the zinc oxide content is increased to around 55% (by weight) in order to obtain the best physical properties and particularly resistance to abrasion in a good ageing compound.

The foregoing analyses of the rubber compounder's reasons for adding zinc oxide to rubber implies that the zinc oxide itself is not an accelerator. This point has been checked up by numerous investigators using the heretofore available commercial brands of zinc oxide with the unanimous conclusion that the zinc oxides of the prior art are not accelerators of cure, but in certain volume percentages may even be classed as retarders of cure. Probably the most unexpected result obtained by the use of our new zinc oxide product in rubber is a most marked and pronounced acceleration of the cure in a rubber-sulfur-zinc oxide compound without any accelerator whatever being added.

Figure 2:
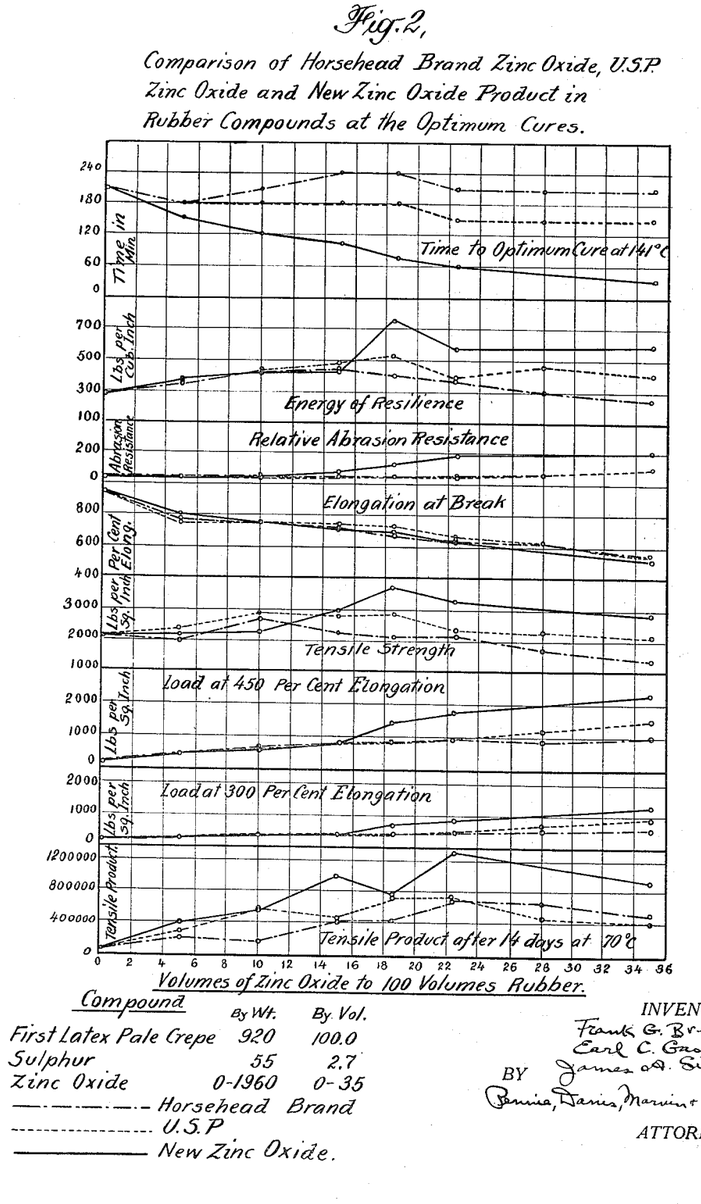
Fig. 2 of the drawing is an explanatory diagram.

Fig. 2 of the accompanying drawing shows a series of curves comparing the curing rates and physical properties of three rubber compounds containing (1) the new zinc oxide product of the invention; (2) the standard commercial rubber reinforcing zinc oxide of the past; and (3) the U. S. P. brand of zinc oxide which we have discovered to have certain different effects in rubber than the standard commercial zinc oxide products heretofore used. These compounds whose properties are represented by the curves of Fig. 2 are the most suited to differentiate the three pigments in that no other added substance than rubber and sulfur are present. Rubber technologists will instantly recognize from these curves the unique properties of the new zinc oxide product. The legends appearing in Fig. 2 make the curves self-explanatory and no further description thereof is necessary, except to state that the optimum cures were determined by the energy of resilience. So far as we are aware, no other homogeneous uncompounded inorganic additive agent gives anything like the results shown in these curves and attributable to the new zinc oxide product.

Returning now to the scientific rubber compounder's first object for adding zinc oxide to compounded rubber, namely, activation of the organic accelerator, the first three of the following tables (tables Nos. 1, 2, and 3) show the superior activating power of the new zinc oxide product as contrasted with the activating power of special grade Horsehead brand zinc oxide.

It is the rubber compounder's third reason or object for adding zinc oxide to rubber stocks—namely better physical properties and particularly increased abrasion resistance with a good ageing compound—that the greatest differentiation between the new zinc oxide product and the Horsehead brand zinc oxide is observed. Tables Nos. 4, 5, 6, 7, and 8 indicate the properties of various pairs of rubber stocks made up under similar conditions for comparison with special grade Horsehead brand zinc oxide and the new zinc oxide product, respectively. It will be observed that in the compounds of table No. 8, no organic accelerator was employed.

The formula or composition of the rubber stocks or compounds appears on each table.

Table No. 1.

Compound: Rubber (first latex pale crêpe), 920 parts (by weight); sulfur, 55 parts; diphenylguanidine, 2 parts; zinc oxide, 28 parts.

| | Time of cure minutes at 40 lbs. | Tensile strength lbs. sq. in. | Per cent elongation | After 14 days at 70° C. | | Load (lbs. sq. in.) for elongation of— | |
|---|---|---|---|---|---|---|---|
| | | | | Tensile strength lbs. sq. in. | Per cent elongation | 300% | 450% |
| Horsehead brand zinc oxide | 30 | 1460 | 965 | | | 73 | 98 |
| | 60 | 1845 | 865 | | | 92 | 161 |
| | 90 | 2190 | 850 | | | 130 | 240 |
| | 120 | 2215 | 820 | | | 109 | 196 |
| | 150 | 2155 | 815 | | | 167 | 277 |
| New zinc oxide product | 30 | 2015 | 795 | | | 145 | 265 |
| | 60 | 2555 | 755 | | | 165 | 330 |
| | 90 | 2965 | 735 | | | 235 | 440 |
| | 120 | 2660 | 685 | | | 240 | 510 |

Table No. 2.

Compound: Rubber (first latex pale crêpe), 920 parts (by weight); sulfur, 55 parts; hexamethylenetetramine, 6 parts; zinc oxide, 28 parts.

| | | | | | | | |
|---|---|---|---|---|---|---|---|
| Horsehead brand zinc oxide | 30 | 1760 | 904 | 556 | 695 | 59 | 118 |
| | 60 | 2617 | 807 | 716 | 547 | 117 | 219 |
| | 90 | 2137 | 794 | 197 | 259 | 172 | 299 |
| | 120 | 3417 | 712 | 215 | 183 | 305 | 688 |
| | 150 | 2758 | 673 | 167 | 130 | 368 | 830 |
| New zinc oxide product | 30 | 2057 | 881 | 468 | 606 | 77 | 129 |
| | 60 | 2877 | 809 | 641 | 496 | 138 | 290 |
| | 90 | 3703 | 775 | 440 | 306 | 206 | 470 |
| | 120 | 3613 | 741 | 240 | 174 | 249 | 580 |
| | 150 | 2655 | 633 | 180 | 133 | 392 | 894 |

Table No. 3.

Compound: First latex pale crêpe, 100 grams; sulfur, 3.5 grams; pip. pip., 0.25 gram; zinc oxide, 23.75 grams.

| | Time of cure minutes at 10 lbs. | Tensile strength lbs. sq. in. | Per cent elongation | Load (lbs. sq. in.) for elongation of— | |
|---|---|---|---|---|---|
| | | | | 300% | 500% |
| Horsehead brand zinc oxide | 30 | 2362 | 780 | 172 | 377 |
| | 60 | 3152 | 730 | 225 | 563 |
| | 90 | 3605 | 720 | 262 | 730 |
| | 120 | 3595 | 800 | 303 | 906 |
| | 150 | 4010 | plus 800 | 334 | 853 |
| New zinc oxide product | 30 | 2562 | 760 | 227 | 585 |
| | 60 | 4510 | 750 | 263 | 945 |
| | 90 | 4270 | 710 | 308 | 1230 |
| | 120 | 4250 | 710 | 340 | 1160 |
| | 150 | 4650 | 800 | 381 | 955 |

Table No. 4.

First latex pale crêpe, 920 grams; sulfur, 55 grams; hexamethylenetetramine, 6 grams; zinc oxide, 1260 gr.

| | Time of cure minutes at 40 lbs. | Tensile strength lbs. sq. in. | Per cent elongation | Abrasion resistance | After 14 days at 70° C. | | Load (lbs. sq. in.) for elongation of— | |
|---|---|---|---|---|---|---|---|---|
| | | | | | Tensile strength lbs. sq. in. | Per cent elongation | 300% | 450% |
| Horsehead brand zinc oxide | 45 | 2970 | 619 | 70 | 2205 | 571 | 595 | 1380 |
| | 60 | 3007 | 594 | 94 | 2177 | 533 | 697 | 1570 |
| | 75 | 3233 | 601 | 109 | 1948 | 480 | 820 | 1795 |
| | 90 | 3225 | 599 | 120 | 1548 | 397 | 742 | 1595 |
| | 105 | 3017 | 578 | 123 | 1566 | 387 | 840 | 1710 |
| | 120 | 2858 | 555 | 132 | 1096 | 247 | 850 | 1730 |
| New zinc oxide product | 30 | 3813 | 632 | 185 | 2863 | 544 | 712 | 1920 |
| | 45 | 3996 | 628 | 266 | 2785 | 503 | 983 | 2230 |
| | 60 | 3637 | 586 | 290 | 2355 | 417 | 1242 | 2557 |
| | 75 | 3485 | 587 | 275 | 2147 | 363 | 1287 | 2525 |
| | 90 | 3252 | 572 | 315 | 1996 | 342 | 1140 | 2395 |
| | 105 | 3240 | 569 | 282 | 1416 | 239 | 1337 | 2465 |
| | 120 | 2856 | 567 | 257 | 1320 | 224 | 1212 | 2250 |

Table No. 5.

First latex pale crêpe, 920 gms.; sulfur, 37 gms.; hexamethylenetetramine, 12 gms.; zinc oxide, 1035 gms.

| | | | | | | | | |
|---|---|---|---|---|---|---|---|---|
| Horsehead brand zinc oxide | 30 | 3017 | 696 | 49 | 2472 | 625 | 424 | 1015 |
| | 45 | 3367 | 676 | 62 | 2845 | 614 | 523 | 1280 |
| | 60 | 3413 | 642 | 92 | 2925 | 578 | 593 | 1410 |
| | 75 | 3575 | 641 | 99 | 2747 | 536 | 675 | 1480 |
| | 90 | 3570 | 659 | 100 | 2768 | 563 | 593 | 1358 |
| | 105 | 3267 | 629 | 109 | 2280 | 489 | 672 | 1490 |
| New zinc oxide product | 30 | 3595 | 752 | 72 | 2948 | 607 | 400 | 1045 |
| | 45 | 3428 | 695 | 132 | 3727 | 626 | 517 | 1305 |
| | 60 | 3995 | 708 | 166 | 3520 | 596 | 570 | 1405 |
| | 75 | 4030 | 686 | 191 | 3228 | 553 | 705 | 1660 |
| | 90 | 3920 | 668 | 206 | 3212 | 555 | 670 | 1475 |
| | 105 | 3833 | 679 | 226 | 2443 | 491 | 690 | 1470 |

Table No. 6.

First latex pale crêpe, 920 grams; sulfur, 55 grams; diphenylguanidine, 1 gram; zinc oxide, 1260 grams.

| | Time of cure minutes at 40 lbs. | Tensile strength lbs. sq. in. | Per cent elongation | Abrasion resistance | After 14 days at 70° C. | | Load (lbs. sq. in.) for elongation of— | |
|---|---|---|---|---|---|---|---|---|
| | | | | | Tensile strength lbs. sq. in. | Per cent elongation | 300% | 450% |
| Horsehead brand zinc oxide | 45 | 2503 | 654 | 95 | 1693 | 601 | 462 | 1194 |
| | 60 | 2640 | 644 | 43 | 1917 | 601 | 568 | 1240 |
| | 75 | 2537 | 625 | 59 | 2038 | 593 | 544 | 1250 |
| | 90 | 2798 | 654 | 70 | 2013 | 509 | 586 | 1285 |
| | 105 | 2797 | 629 | 72 | 1850 | 551 | 626 | 1328 |
| | 120 | 2683 | 623 | 80 | 1833 | 551 | 580 | 1325 |
| New zinc oxide product | 45 | 3408 | 598 | 172 | 2638 | 545 | 745 | 2010 |
| | 60 | 3300 | 576 | 206 | 2492 | 484 | 935 | 2010 |
| | 75 | 3567 | 633 | 247 | 2435 | 476 | 883 | 1883 |
| | 90 | 3450 | 605 | 252 | 1813 | 346 | 1055 | 2155 |
| | 105 | 3430 | 610 | 259 | 1653 | 307 | 1050 | 2040 |
| | 120 | 3210 | 606 | 264 | 1635 | 298 | 923 | 1885 |

Table No. 7.

First latex pale crêpe, 920 grams; sulfur, 55 grams; thiocarbanilide, 25 grams; zinc oxide, 1035 grams.

| | | | | | | | | |
|---|---|---|---|---|---|---|---|---|
| Horsehead brand zinc oxide | 45 | 2780 | 647 | 59 | 2528 | 588 | 506 | 1230 |
| | 60 | 2803 | 632 | 70 | 2541 | 583 | 560 | 1295 |
| | 75 | 2708 | 606 | 75 | 2326 | 539 | 637 | 1325 |
| | 90 | 2872 | 622 | 91 | 1943 | 484 | 620 | 1390 |
| | 120 | 2780 | 601 | 107 | 1090 | 300 | 688 | 1500 |
| New zinc oxide product | 45 | 3690 | 624 | 190 | 3093 | 546 | 860 | 1950 |
| | 60 | 3613 | 620 | 207 | 2325 | 422 | 1015 | 2075 |
| | 75 | 3593 | 620 | 223 | 1746 | 331 | 1075 | 2100 |
| | 90 | 3690 | 627 | 238 | 1476 | 282 | 970 | 2010 |
| | 120 | 3033 | 572 | 230 | 1090 | 211 | 925 | 1910 |

Table No. 8.

Compound: First latex pale crêpe, 920 grams; sulfur, 55 grams; zinc oxide, 1260 grams.

| | Time of cure minutes at 40 lbs. | Tensile strength lbs. sq. in. | Per cent elongation | Abrasion resistance | After 14 days at 70° C. | | Load (lbs. sq. in.) for elongation of— | |
|---|---|---|---|---|---|---|---|---|
| | | | | | Tensile strength lbs. sq. in. | Per cent elongation | 300% | 450% |
| Horsehead brand zinc oxide | 150 | 1930 | 642 | | 1775 | 73 | 405 | 890 |
| | 180 | 2052 | 652 | | 1762 | 335 | 444 | 890 |
| | 210 | 2583 | 651 | | 1497 | 473 | 485 | 1000 |
| | 240 | 2233 | 639 | | 1188 | 394 | 525 | 1080 |
| New zinc oxide product | 45 | 3495 | 615 | 157 | | | 835 | 1855 |
| | 60 | 3340 | 630 | 188 | | | 800 | 1745 |
| | 90 | 2957 | 551 | 257 | 1860 | 303 | 1282 | 2430 |
| | 120 | 3130 | 556 | 250 | 1290 | 220 | 1205 | 2170 |
| | 150 | 3137 | 597 | 244 | 1220 | 195 | 1058 | 1960 |
| | 180 | 2785 | 547 | 228 | 1255 | 220 | 1215 | 2100 |

The resistance to abrasive wear of compounded rubber has heretofore been commonly measured by manufacturing a vehicle tire with two or more kinds of rubber stock forming separate segments of the tread. This tire is then placed in actual use and the relative rates of wear of the several segments observed and measured. In order to avoid the cost and to shorten the time required for such actual service tests, test methods of determining the relative abrasive resistance of compounded rubber have been devised. One such test method consists in subjecting the several pieces of compounded rubber to the abrasive action of a revolving sharp sand concrete track and comparing the relative volume losses after a predetermined time.

The numerical figures for resistance to abrasion (abrasive indices) given herein have been determined on an abrasion machine of the character described at length in our copending application, Serial No. 564,021, and also described in the Rubber Age, published at New York city, March 10, 1923, pages 403–404. This machine consists essentially of a revolving sharp sand concrete ring or annular track several feet in diameter and two or three times as wide as the specimens to be abraded. The specimens to be abraded are held stationary with respect to the revolving track in a clamp which fastens but one end of the specimen and allows the greater portion of the specimen to lie flat on the abrading track under the weight of the clamp, which is constant. The clamp is free to move vertically to take care of unevenness in the practice. The track is kept clear of abraded rubber by brushes and suction, and is rotated at such a speed (about 30 R. P M.) that approximately 0.3 cubic inches of rubber are abraded from an area of 4 square inches under a pressure of 13 ounces per square inch for 1000 revolutions of the track from a sample of rubber stock compounded with the aforementioned special grade Horsehead brand zince oxide in accordance with the following composition:

| | Grams. |
|---|---|
| First latex pale crêpe (washed and dried) | 920 |
| Sulfur | 55 |
| Hexamethylenetetramine | 6 |
| Zinc oxide | 1260 |

The crude rubber is first treated on the milling rolls, and when appropriately broken down, the other ingredients of the composition are worked therein. After this mixture has been appropriately worked on the milling rolls thoroughly to incorporate all of the ingredients uniformly throughout the crude rubber, the resulting product is allowed to stand for an appropriate period of time, usually twenty-four hours or so, and is then put into a hydraulic press vulcanizer and vulcanized. The time of cure is 90 minutes at a temperature of 141° C. (which corresponds to 40 pounds dry steam pressure) with a hydraulic pressure of 2000 pounds per sq. in. in a press having a ram diameter of 10 inches and with the area of the rubber between the platens of 120 sq. in. After the rubber has been removed from the press for 24 hours it is tested for tensile and abrasion resistance qualities.

In operating the abrasion machine, four rubber specimens are arranged with the holders equally spaced apart over the track, so that all four specimens are subjected to the same treatment, thus giving relative values. By weighing the sample before and after abrasion and determining its specific gravity, the volume loss can be computed. The figures for relative abrasion resistance of different rubber stocks, as determined on the abrasion machine above described, have been found to check up very closely with the relative abrasion resistance of those same stocks when put on as segments of a vehicle tire and subjected to actual service wear. In using the abrasion machine, the volume losses of the rubber specimens are determined by the losses in weight of the specimens divided by their respective specific gravities. Since the volume loss of a specimen varies inversely as its resistance to abrasive wear, it is customary to indicate the abrasive resistance as the reciprocal of the volume loss, and this practice has been followed in the determination of the numerical figures for abrasion resistance given herein. For example, if the abrasion index of the standard test specimen is assigned an arbitrary value of 115, and if the volume loss of the standard is 4.050 per 1000 revolutions and that of the specimen to be compared is 6.265, then the abrasion index of the last mentioned test specimen will be $$\frac{4.050}{6.265} \times 115 = 74.$$

The advantages which the new product of the present invention possesses, when used as a strengthening or reinforcing agent in compounded rubber, are well illustrated by the foregoing comparative examples. Tables 7, 8, 9 and 10 show the radically increased abrasion resistance, amounting to around 100% and more, which rubber compounds containing the new zinc oxide product possess as compared with the standard rubber reinforcing zinc oxide of the prior art. The foregoing tables show that the new zinc oxide gives a materially increased tensile strength to compounded rubber and appreciably increases the rate of cure. The new zinc oxide product also imparts to the compounded rubber a marked improvement in the resistance to heat ageing.

The marked improvement in the vulcanized rubber products obtained with the new zinc oxide product of the present invention will be readily appreciated by rubber technologists. The improved results which can be obtained with this new product cannot be obtained, so far as we are aware, with any zinc oxide heretofore commercially available to the rubber industry.

The use of the new zinc oxide product, in its preferred form, involves such a radical improvement over the zinc oxide compounding agents heretofore commercially employed that precautions should be taken (in substituting an equal amount thereof for the heretofore standard zinc oxides) to avoid over-vulcanization, as by reducing the amount of sulfur or the time of vulcanization, etc.

When the zinc oxide product of the invention is made in the manner hereinbefore described, by the vaporization of high grade zinc and the intensive combustion of the zinc vapor, with substantially instantaneous chilling and dilution of the resulting fume, the fume product is free, or substantially free, from impurities, such as chloride, sulfate, etc., and we attribute in part the radically improved properties of the new product as a rubber reinforcing agent to the absence or substantial absence of such impurities.

The unique qualities of the product of the invention, in its preferred form, are strikingly illustrated by its behavior when compounded with plantation rubber in the absence of sulfur or any other compounding ingredient. After mixing oxide into the rubber in the usual way on the rolls, the compound will be seen to act short and dry and have a marked tendency to roughen on the surface, very much like a stock that contains sulfur and too fiery an accelerator and that is "scorching on the rolls", to use rubber mill language. If a sample of the compound mixed as just described and containing about 20 volumes of the zinc oxide product of the invention to 100 volumes of first latex pale crêpe is suspended in benzol, the compound will not readily dissolve to a milky suspension as is the normal action of unvulcanized rubber and zinc oxide compounds of the prior art, but the sample will remain apparently but slightly affected, outside of some swelling, and the benzol will stay fairly clear, resembling in this effect a compound containing high grade gas black.

As the result of our investigations and researches, we have also determined that the average particle size of the zinc oxide has a very pronounced influence upon the properties of the zinc oxide as a rubber reinforcing agent, and it is our present opinion that the radically improved properties of the zinc oxide product of the present invention as a rubber reinforcing agent are probably also due in large measure to its extreme fineness of particle size.

However, while we attribute the improved reinforcing power of the new product of the invention to its extreme fineness of particle size, and the substantial absence of objectionable impurities, we do not wish to restrict ourselves to this explanation or interpretation of its greatly superior properties when used in compounded rubber. Furthermore, while we have described the new zinc oxide product from the standpoint of its capacity for imparting radically increased resistance to abrasive wear in compounded rubber, we do not intend thereby to limit the invention or the use of the new zinc oxide product to the reinforcing or strengthening of rubber but, in the appended claims, we intend to cover our new zinc oxide product as a new article of manufacture.

With respect to its effect on rubber, the properties of the new zinc oxide product of the invention may be briefly summarized as follows:

1. Non-reactivity in benzol of unvulcanized compound.

2. Acceleration of vulcanization.

3. Increased activation of organic accelerators.

4. Improvement in physical properties of rubber.
  (a) increase in resistance to abrasion,
  (b) increase in tensile strength (with slight increase in elongation).
  (c) improved ageing.

The non-reactivity in benzol of the zinc oxide product of the invention has already been discussed, and the acceleration of vulcanization has been referred to. Heretofore, rubber reinforcing zinc oxides have been recognized in the industry as retarders in vulcanization. Our new zinc oxide product, more particularly in its preferred form, acts distinctly as an accelerator of vulcanization.

We are not now able to state just what physical or chemical characteristic of the new zinc oxide product is responsible for its acceleration of vulcanization. We believe, however, that this valuable property of the new zinc oxide product is due, in some measure at least, to its small particle size and its relatively low acidity. With respect to the acidity of the new zinc oxide product, in its preferred form, we find that the acidity may be expressed as about 0.02 to 0.04% in terms of $SO_3$. The acidity is determined in the following manner:

Five grams of the oxide are weighed into a 250 c. c. Erlenmeyer flask, 75 c. c. boiled and cooled distilled water are added, and the flask agitated for a half hour. The acidity is then titrated with twenty-fifth normal $\left(\frac{N}{25}\right)$ sodium hydrate to a pink color. A permanent pink end point can be obtained with readings up to several cubic centimeters. For higher readings, permanency of color becomes increasingly difficult to obtain. Therefore, in such cases, titrate until the pink color is seen through the oxide while swirling the flask. This color remains a short time, but will then disappear upon again swirling the flask.

1 c. c. $\frac{N}{25}$ NaOH = .032% acidity as $SO_3$.

While the acidity of the new zinc oxide product when made in accordance with our preferred practice does not exceed the equivalent of 0.05% $SO_3$, and is ordinarily about 0.02 to 0.04%, we have found that the zinc oxide products of the invention whose acidity is not greater than the equivalent of 0.1% $SO_3$ exhibit substantial accelerating effects in vulcanization.

The improvements in the physical properties of rubber compounded with the zinc oxide product of the invention clearly appear from the tabulated results of the determinations hereinbefore mentioned. With respect to the ageing with the new zinc oxide product, it is found that such rubber retains its tensile strength and elongation when kept in an oven at 70° C. for fourteen days in a far more satisfactory manner than does rubber compounded with the heretofore customary rubber reinforcing zinc oxides.

The intense combustion which characterizes the process hereinbefore described for producing the improved zinc oxide product of our invention is not to be understood as implying combustion at exceedingly high temperatures. We have herein used the word "intensive" to define the combustion at a high rate within a restricted space or volume. Thus, by intense combustion we mean the combustion or oxidation of the zinc vapor at a high rate within a restricted space or volume without regard to the effect of such restriction upon temperature.

In certain of the appended claims we have defined our new zinc oxide product with respect to its superior capacity for imparting to compounded rubber resistance to abrasive wear. This manner of defining the product has been adopted merely for the purpose of identifying the same and for clearly differentiating this new product from the zinc oxide products of the prior art. It is to be understood that we do not intend thereby to limit the application of the new zinc oxide product to that of a rubber reinforcer, but we aim in the appended claims to cover this new product to whatever use it may be put. We have adopted as a standard of comparison, the special grade Horsehead brand zinc oxide, whose present day quality we have hereinbefore defined, because this is the present day recognized standard of high grade zinc oxide for rubber compounding.

We claim:

1. As a new article of manufacture, a fumed zinc oxide product having an average particle size not exceeding about 0.25 microns.

2. As a new article of manufacture, a fumed zinc oxide product having an average particle size not exceeding about 0.15 microns.

3. As a new article of manufacture, a fumed zinc oxide product possessing the capacity of substantially accelerating the cure of compounded rubber.

4. As a new article of manufacture, a fumed zinc oxide product possessing the capacity of substantially accelerating the cure of compounded rubber and whose average particle size does not exceed about 0.25 microns.

5. As a new article of manufacture, a fumed zinc oxide product possessing the capacity of substantially accelerating the cure of compounded rubber and whose average particle size does not exceed about 0.15 microns.

6. As a new article of manufacture, a fumed zinc oxide product possessing the capacity of substantially accelerating the cure of compounded rubber and whose acidity is not greater than the equivalent of 0.1% $SO_3$.

7. As a new article of manufacture, a fumed zinc oxide product possessing the capacity of substantially accelerating the cure of compounded rubber and whose acidity is not greater than the equivalent of 0.05% $SO_3$.

8. As a new article of manufacture, a fumed zinc oxide product having an average particle size not exceeding about 0.25 microns and acidity not greater than the equivalent of 0.1% $SO_3$.

9. As a new article of manufacture, a fumed zinc oxide product having an average particle size not exceeding about 0.25 microns and acidity not greater than the equivalent of 0.05% $SO_3$.

10. As a new article of manufacture, a fumed zinc oxide product having an average particle size not exceeding about 0.15 microns and acidity not greater than the equivalent of 0.1% $SO_3$.

11. As a new article of manufacture, a fumed zinc oxide product having an average particle size not exceeding about 0.15 microns and acidity not greater than the equivalent of 0.05% $SO_3$.

12. As a new article of manufacture, a fumed zinc oxide product having an average particle size not exceeding about 0.25 microns and acidity not greater than the equivalent of 0.1% $SO_3$, and possessing the capacity of substantially accelerating the cure of compounded rubber.

13. As a new article of manufacture, a fumed zinc oxide product having an average particle size not exceeding about 0.25 microns and acidity not greater than the equivalent of 0.05% $SO_3$, and possessing the capacity of substantially accelerating the cure of compounded rubber.

14. As a new article of manufacture, a fumed zinc oxide product having an average particle size not exceeding about 0.15 microns and acidity not greater than the equivalent of 0.1% $SO_3$, and possessing the capacity of substantially accelerating the cure of compounded rubber.

15. As a new article of manufacture, a fumed zinc oxide product having an average particle size not exceeding about 0.15 microns and acidity not greater than the equivalent of 0.05% $SO_3$, and possessing the capacity of substantially accelerating the cure of compounded rubber.

16. As a new article of manufacture, a fumed zinc oxide product having an average particle size less than 0.15 microns and acidity equivalent to from about 0.02% to about 0.04% $SO_3$, and possessing the capacity of substantially accelerating the cure of compounded rubber.

17. As a new article of manufacture, a fumed zinc oxide product having the capacity of imparting to compounded rubber a resistance to abrasive wear materially superior to that of special grade Horsehead brand zinc oxide.

18. As a new article of manufacture, a fumed zinc oxide product having the capacity of imparting to compounded rubber a resistance to abrasive wear at least 20% greater than that of special grade Horsehead brand zinc oxide.

19. As a new article of manufacture, zinc oxide having the capacity of imparting to compounded rubber an increased resistance to abrasion of about 100% or more as compared with special grade Horsehead brand zinc oxide.

20. As a new article of manufacture, a fumed zinc oxide product having an average particle size not exceeding about 0.25 microns and having the capacity of imparting to compounded rubber a resistance to abrasive wear materially superior to that of special grade Horsehead brand zinc oxide.

21. As a new article of manufacture, a fumed zinc oxide product having an average particle size not exceeding about 0.25 microns and having the capacity of imparting to compounded rubber a resistance to abrasive wear at least 20% greater than that of special grade Horsehead brand zinc oxide.

22. As a new article of manufacture, zinc oxide of an average particle size not exceeding about 0.15 microns and having the capacity of imparting to compounded rubber an increased resistance to abrasion of about 100% or more as compared with special grade Horsehead brand zinc oxide.

23. As a new article of manufacture, zinc oxide having the capacity of imparting to compounded rubber a resistance to abrasive wear substantially superior to that of special grade Horsehead brand zinc oxide and possessing the capacity of substantially accelerating the cure of compounded rubber.

24. As a new article of manufacture, zinc oxide having the capacity of imparting to compounded rubber a resistance to abrasive wear at least 20% greater than that of special grade Horsehead brand zinc oxide and possessing the capacity of substantially accelerating the cure of compounded rubber.

25. As a new article of manufacture, zinc oxide having the capacity of imparting to compounded rubber an increased resistance to abrasion of about 100% or more as compared with special grade Horsehead brand zinc oxide and possessing the capacity of substantially accelerating the cure of compounded rubber.

26. As a new article of manufacture, a fumed zinc oxide product having an average particle size not exceeding about 0.25 microns and an acidity not greater than the equivalent of 0.1% $SO_3$ and having the capacity of imparting to compounded rubber a resistance to abrasive wear materially superior to that of special grade Horsehead brand zinc oxide.

27. As a new article of manufacture, a fumed zinc oxide product having an average particle size not exceeding about 0.15 microns and an acidity not greater than the equivalent of 0.1% $SO_3$ and having the capacity of imparting to compounded rubber an increased resistance to abrasion of about 100% or more as compared with special grade Horsehead brand zinc oxide.

28. As a new article of manufacture, a fumed zinc oxide product having an average particle size not exceeding about 0.25 microns and having the capacity of imparting to compounded rubber a resistance to abrasive wear materially superior to that of special grade Horsehead brand zinc oxide and possessing the capacity of substantially accelerating the cure of compounded rubber.

29. As a new article of manufacture, a fumed zinc oxide product having an average particle size not exceeding about 0.15 microns and having the capacity of imparting to compounded rubber an increased resistance to abrasion of about 100% or more as compared with special grade Horsehead brand zinc oxide and possessing the capacity of substantially accelerating the cure of compounded rubber.

30. As a new article of manufacture, a fumed zinc oxide product having an average particle size not exceeding about 0.25 microns and having the capacity of imparting to compounded rubber a resistance to abrasive wear materially superior to that of special grade Horsehead brand zince oxide and having an acidity not greater than the equivalent of 0.05% $SO_3$.

31. As a new article of manufacture, zinc oxide of an average particle size less than 0.15 microns and acidity equivalent to from about 0.02% to about 0.04% $SO_3$ and having the capacity of imparting to compounded rubber an increased resistance to abrasion of about 100% or more as compared with special grade Horsehead brand zinc oxide and possessing the capacity of substantially accelerating the cure of compounded rubber.

32. As a new article of manufacture, zinc oxide having the capacity, substantially as described, when mixed in a twenty volume ratio with first latex pale crêpe, of rendering the compound resulting from the mixture insoluble in benzol and thereby not giving the milky suspension normal to an unvulcanized zinc oxide rubber compound of the prior art.

33. As a new article of manufacture, a fumed zinc oxide product having an average particle size not exceeding about 0.15 microns and having the capacity of imparting to compounded rubber an increased resistance to abrasion of about 100% or more as compared with special grade Horsehead brand zinc oxide and having an acidity not greater than the equivalent of 0.05% $SO_3$.

34. As a new article of manufacture, zinc oxide of an average particle size not exceeding about 0.25 microns and having the capacity of imparting to compounded rubber a resistance to abrasive wear materially superior to that of special grade Horsehead brand zinc oxide and having an acidity not greater than the equivalent of 0.1% $SO_3$ and possessing the capacity of substantially accelerating the cure of compounded rubber.

35. As a new article of manufacture, zinc oxide of an average particle size not exceeding about 0.15 microns and having the capacity of imparting to compounded rubber an increased resistance to abrasion of about 100% or more as compared with special grade Horsehead brand zinc oxide and having an acidity not greater than the equivalent of 0.1% $SO_3$ and possessing the capacity of substantially accelerating the cure of compounded rubber.

36. As a new article of manufacture, zinc oxide of an average particle size not exceeding about 0.25 microns and having an acidity not greater than the equivalent of 0.05% $SO_3$ and having the capacity of imparting to compounded rubber a resistance to abrasive wear materially superior to that of special grade Horsehead brand zinc oxide and possessing the capacity of substantially accelerating the cure of compounded rubber.

37. As a new article of manufacture, zinc oxide of an average particle size not exceeding about 0.15 microns and having an acidity not greater than the equivalent of 0.05% $SO_3$ and having the capacity of imparting to compounded rubber an increased resistance to abrasion of about 100% or more as compared with special grade Horsehead brand zinc oxide and possessing the capacity of substantially accelerating the cure of compounded rubber.

In testimony whereof we affix our signatures.

FRANK G. BREYER.
EARL C. GASKILL.
JAMES A. SINGMASTER.